United States Patent [19]

Phillips

[11] 4,389,701
[45] Jun. 21, 1983

[54] ILLUMINATION SYSTEM

[75] Inventor: Edward H. Phillips, Middletown, Calif.

[73] Assignee: Optimetrix Corporation, Mountain View, Calif.

[21] Appl. No.: 200,780

[22] Filed: Oct. 27, 1980

[51] Int. Cl.³ .................... F21V 7/04; F21V 13/04
[52] U.S. Cl. ......................... 362/308; 355/67; 362/263; 362/299; 362/300; 362/301; 362/307
[58] Field of Search ............... 362/263, 301, 308, 307, 362/299, 300; 355/67

[56] References Cited

U.S. PATENT DOCUMENTS

| | | | |
|---|---|---|---|
| 3,329,812 | 4/1967 | Harling | 362/263 |
| 3,457,401 | 7/1969 | Hoekstra | 362/263 |
| 3,689,760 | 9/1972 | Stewart | 362/308 |
| 3,768,900 | 10/1973 | McLintic | 362/308 |
| 4,225,923 | 9/1980 | Bloemendal et al. | 355/67 |
| 4,241,392 | 12/1980 | Boone | 355/67 |
| 4,281,366 | 7/1981 | Wurster et al. | 362/308 |

Primary Examiner—Irwin Gluck
Attorney, Agent, or Firm—Roland I. Griffin

[57] ABSTRACT

An illumination system having a light source disposed along a central axis of the system is provided with a conical reflector coaxially disposed about the light source for forming an annular virtual image of an arc of the light source. A toroidal lens is coaxially disposed about the central axis for forming a circular real image of the annular virtual image of the arc at the input port of a utilization device.

10 Claims, 6 Drawing Figures

ILLUMINATION SYSTEM

BACKGROUND AND SUMMARY OF THE INVENTION

This invention relates to illumination systems of the type employing a light source and a reflector coaxially mounted along a central axis of the illumination system for reflecting light, which emanates radially outward from an arc of the light source, generally along the central axis to a utilization device.

Prior art illumination systems of the foregoing type employing light sources, such as mercury or xenon lamps of the short arc type, and elliptical reflectors are commonly used in the semiconductor industry to illuminate light integrators used with such illumination systems or other such utilization devices. However, these illumination systems are not capable of efficiently imaging reflected light from the elliptical reflector at the utilization device because the magnification of the arc of the light sources varies significantly in the azimuthal direction across the curved surface of the elliptical reflector so that the field size of the image of the arc also varies significantly at the utilization device.

It is the principal object of this invention to provide an improved illumination system of the same general type for more efficiently imaging the reflected light at the utilization device.

This object is accomplished in accordance with the illustrated preferred embodiment of the present invention by employing a light source, such as a mercury or xenon lamp of the short arc or capillary type, mounted along a central axis of the illumination system to emit light radially outward from an arc disposed on the central axis, and by further employing a conical reflector and a toroidal lens coaxially mounted about the central axis to direct light, which emanates radially outward from the arc of the light source, symmetrically about the central axis to a utilization device. The conical reflector and the toroidal lens provide a substantially constant magnification of the arc of the light source and concomitantly a substantially constant field size of the image of the arc that may be matched to the input port of the utilization device.

BRIEF DESCRIPTION OF THE DRAWINGS

Other objects and features of the invention will become apparent from the following detailed description taken in combination with the accompanying drawings in which.

DESCRIPTION OF THE PREFERRED EMBODIMENT

Figure 1:
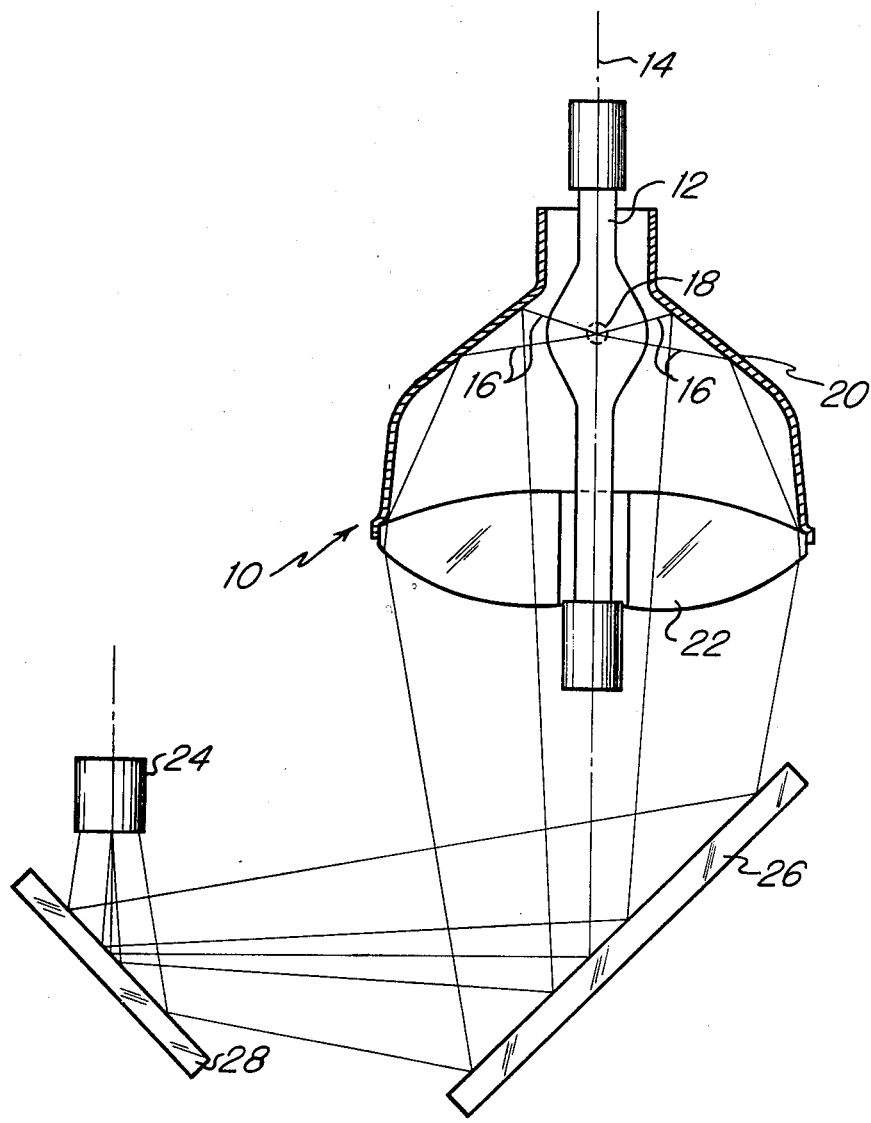
FIG. 1 is a cross-sectional view of an improved illumination system employing a conical reflector and a toroidal lens in accordance with the preferred embodiment of the invention.

Referring to FIG. 1, there is shown an improved illumination system 10 according to the preferred embodiment of the invention. This illumination system 10 employs a light source 12 comprising a mercury or xenon lamp of the short arc type coaxially and fixedly mounted along a central axis 14 of the illumination system to emit light 16 radially outward from an arc 18 disposed in a central region of the lamp along the central axis. Illumination system 10 further employs a conical reflector 20 and a toroidal lens 22 both also coaxially and fixedly mounted along the central axis 14 for directing light 16, which emanates radially outward from the arc 18 of light source 12 and the central axis, along the central axis to an input port of a utilization device 24 via a pair of mirrors 26 and 28 each fixedly mounted at an angle of forty-five degrees with respect to the central axis. Utilization device 24 may comprise, for example, a light integrator that is utilized with illumination systems in some applications, as shown and described, for example, in U.S. patent application Ser. No. 26,722 entitled IMPROVED STEP-AND-REPEAT PROJECTION ALIGNMENT AND EXPOSURE SYSTEM, filed on Apr. 3, 1979, assigned to the same assignee as the present application, and incorporated by reference herein, (U.S. Pat. application Ser. No. 26,722 has been abandoned in favor of contintuation U.S. Pat. application Ser. No. 396,099 filed July 7, 1982). Conical reflector 20 may be formed as an integral part of a reflector and mounting member including nonconical portions for peripherally engaging and holding toroidal lens 22 in place between the conical reflector and utilization device 24. The conical reflector 20 (or the reflector and mounting member of which it is a part) and the toroidal lens 22 may each include a central opening through which opposite ends of light source 12 protrude to facilitate mounting and making electrical connections to the light source.

Figure 2:
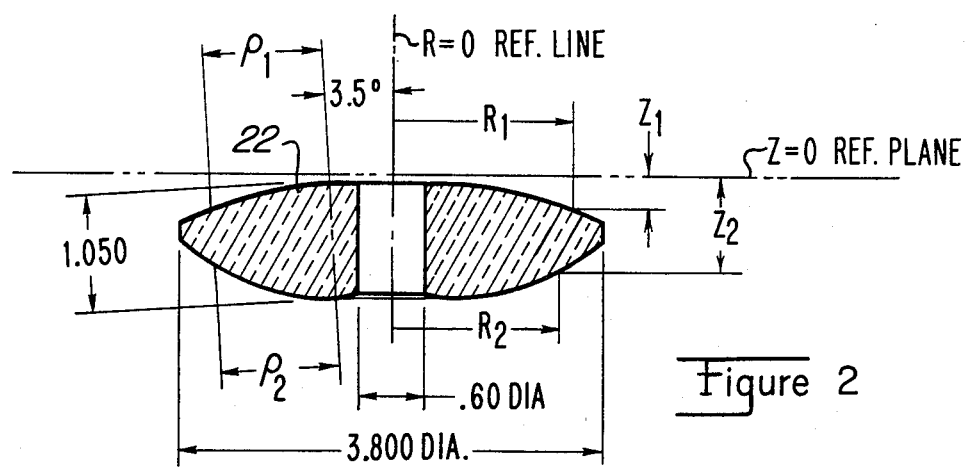
FIG. 2 is a cross-sectional view of the toroidal lens employed in the illumination system of FIG. 1 with dimensional information illustrating how such a toroidal lens may be constructed.

Toroidal lens 22 may be fabricated as shown in FIG. 2 where $R_1$ is a dependent variable representing the radius of every point on the upper surface of the toroidal lens as measured from an $R=0$ reference line coaxially passing through the toroidal lens, and where $Z_1$ is a dependent variable representing the distance of every point on the upper surface of the toroidal lens with the same value of $R_1$ from a $Z=0$ reference plane orthogonally intersecting the $R=0$ reference line. The dependent variables $R_1$ and $Z_1$ are defined by the following equations, where $\rho_1$ is an independent variable representing the orthogonal distance between every point on the upper surface of the toroidal lens and a reference cone coaxially disposed about the R=0 reference line and defining an angle of 3.5° with respect to that reference line:

$$R_1 = 0.57795 + 0.99813\rho_1 - \frac{0.02499\rho_1^2}{1 + \sqrt{1 + 0.7223\rho_1^2}} + 0.0000948\rho_1^4 \quad (1)$$

$$Z_1 = 0.03535 + 0.06105\rho_1 + \frac{0.40853\rho_1^2}{1 + \sqrt{1 + 0.7223\rho_1^2}} - 0.001549\rho_1^4 \quad (2)$$

Similarly, $R_2$ is a dependent variable representing the radius of every point on the lower surface of the toroidal lens as measured from the R=0 reference line, and $Z_2$ is a dependent variable representing the distance of every point on the lower surface of the toroidal lens with the same value of $R_2$ from the Z=0 reference plane. The dependent variables $R_2$ and $Z_2$ are defined by the following equations, where $\rho_2$ is an independent variable representing the orthogonal distance between every point on the lower surface of the toroidal lens and the reference cone:

$$R_2 = 0.51385 + 0.99813\rho_2 + \frac{0.04271\rho_2^2}{1 + \sqrt{1 + 0.09118\rho_2^2}} + 0.0002098\rho_2^4 \quad (3)$$

$$Z_2 = 1.08339 + 0.06105\rho_2 - \frac{0.69829\rho_2^2}{1 + \sqrt{1 + 0.09118\rho_2^2}} - 0.003431\rho_2^4 \quad (4)$$

As further shown in FIG. 2, toroidal lens 22 may have a thickness of 1.050 inches, an outer diameter of 3.800 inches, and an inner diameter (i.e., the diameter of the central opening therein) of 0.60 of an inch. For these dimensions the upper and lower surface of the toroidal lens 22 may be defined by employing values of the independent variables $\rho_1$ and $\rho_2$ ranging between $-0.30$ and $+1.40$.

Figure 3:
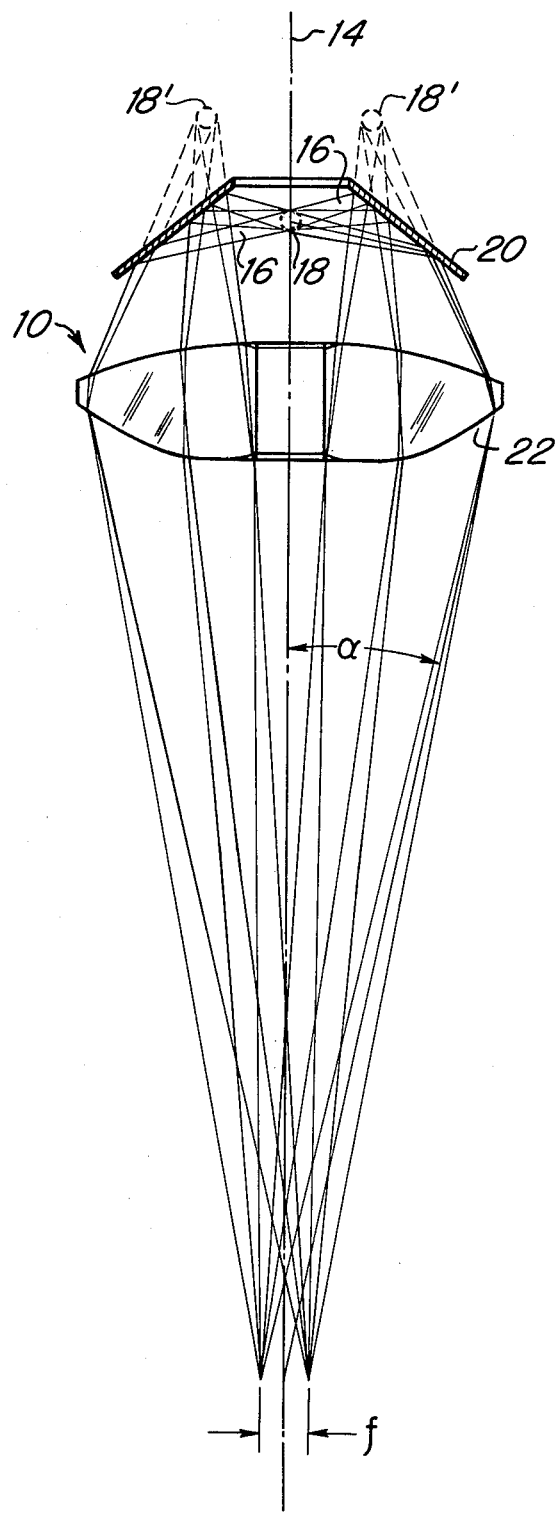
FIG. 3 is a diagrammatic view of an improved illumination system like that of FIG. 1 illustrating the imaging of the light radially emanating from the light source and reflected generally along the central axis of the illumination system by the conical reflector.

Referring now to FIG. 3, there is shown a diagrammatic view of an illumination system 10 like that of FIG. 1 (without the mirrors 26 and 28). From this diagrammatic view it may be seen that conical reflector 20 reflects light 16, which emanates radially outward from the arc 18 disposed on the central axis 14 of the illumination system, downward from a virtual light source or image 18' of the arc in the form of an annulus symmetrically disposed about the central axis. Toroidal lens 22 in turn directs the reflected light from conical reflector 20 downward and inward symmetrically about the central axis 14 to form real images of all portions of the annular virtual light source 18' overlaid at an image plane to form a circular field of light that may be positioned coincident with the input of the utilization device. Each of these real images has the same magnification as determined by the distance from toroidal lens 22 to the real image plane divided by the distance from the toroidal lens to the annular virtual light source 18'. Thus, the circular field of light may be provided with a single size f and a numerical aperture (i.e., the sine of the angle $\alpha$) optimally matched to the size and required numerical aperture of the input port of the utilization device.

Figure 4:
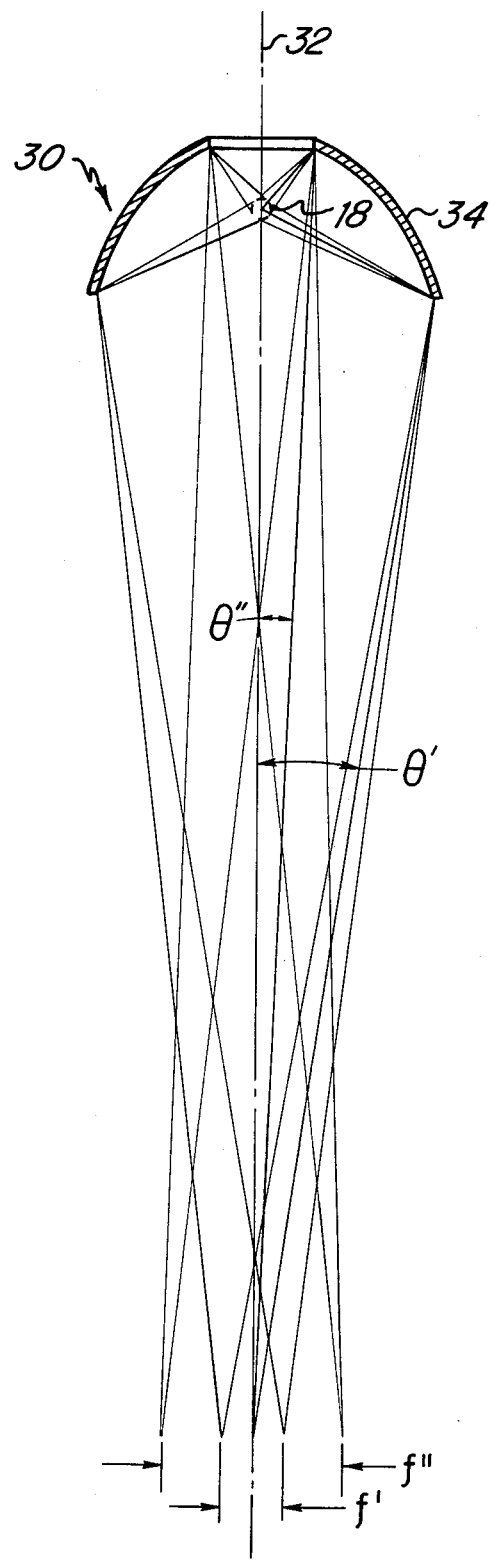
FIG. 4 is a diagrammatic view of a prior art illumination system employing an elliptical reflector and illustrating the imaging of the light radially emanating from the light source and reflected along the central axis of the illumination system by the elliptical reflector.

It has not been possible to achieve such optimum imaging with prior art illumination systems of the same general type which typically employ an elliptical reflector. As may be seen from the diagrammatic view of such an illumination system 30 shown in FIG. 4, light emanating radially outward from an arc 18 disposed on a central axis 32 of the illumination system is reflected downwardly from the elliptical reflector 34 to form real images of the arc as viewed by different azimuthal annuli of the elliptical reflector at an image plane. Each of these real images has a different magnification as determined by the distance between the corresponding azimuthal annulus of elliptical reflector 34 and the real image plane divided by the distance between that azimuthal annulus of the elliptical reflector and arc 18. Thus, the real images formed by the light reflected from elliptical reflector 34 range in size between f' and f" and in numerical aperture from the sine of the angle $\theta'$ to the sine of the angle $\theta''$ thereby making it impossible to optimally match the illumination system 30 to an input port of a fixed size and a required numerical aperture.

Figure 5:
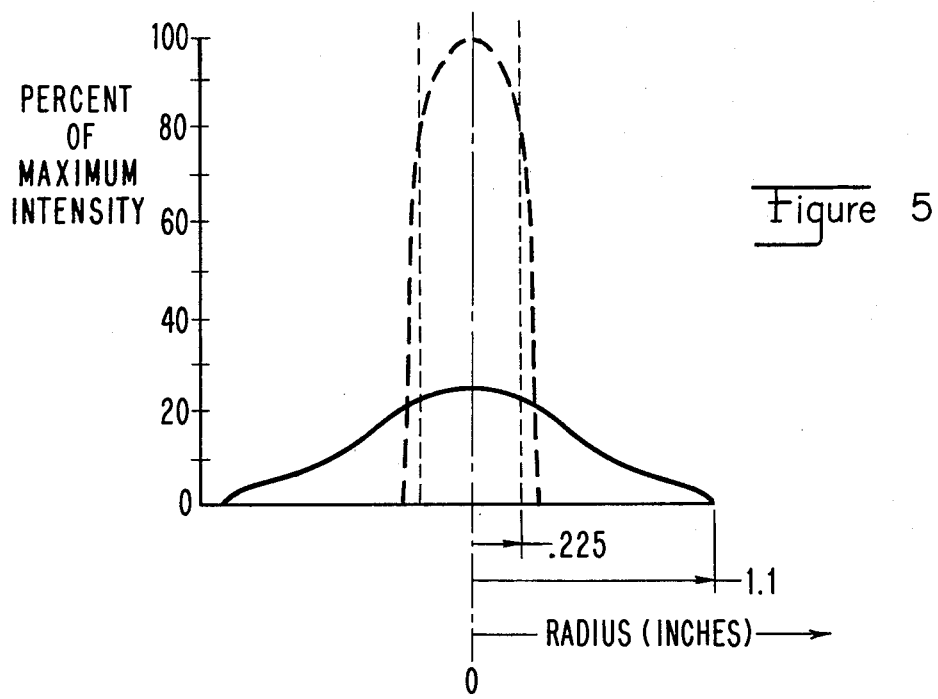
FIG. 5 is a plot of the percent of maximum intensity of imaged light as a function of radius in a solid line for a prior art illumination system utilizing an elliptical reflector as shown in FIG. 4 and in a dashed line for an illumination system utilizing a conical reflector and a toroidal lens in accordance with the preferred embodiment of the invention as shown in FIGS. 1 and 3.

Assuming that it is desired to employ an improved illumination system 10 such as that shown in FIG. 1 with a utilization device 24 having an input port with a radius of 0.225 inch, it may be seen from FIG. 5 (as shown by the dashed line) that the light provided by the illumination system is concentrated within a radius substantially equal to that of the input port of the desired utilization device. In contrast it may also be seen from FIG. 5 (as shown by the solid line) that a large portion of the light provided by a prior art illumination system 30 such as that shown in FIG. 4 falls at radii greater than the radius of the input port of the desired utilization device. Thus, the intensity of the light provided within the input port of the desired utilization device by the prior art illumination system 30 is much lower than the intensity of the light provided by the improved illumination system 10.

Figure 6:
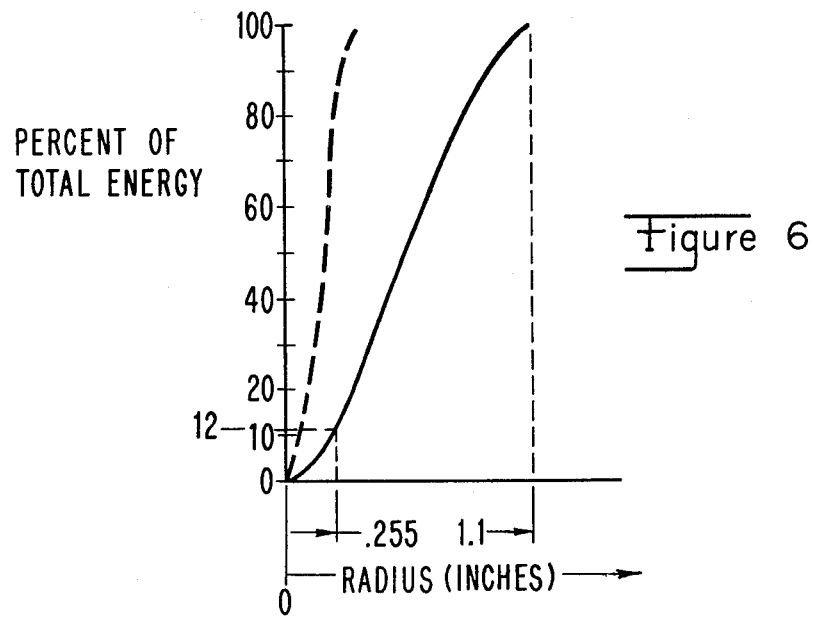
FIG. 6 is a plot of the percent of total energy of imaged light as a function of radius in a solid line for a prior art illumination system utilizing an elliptical reflector as shown in FIG. 4 and in a dashed line for an illumination system utilizing a conical reflector and a toroidal lens in accordance with the preferred embodiment of the invention as shown in FIGS. 1 and 3.

Similarly, with reference to FIG. 6 (as shown by the dashed line) it may be seen that substantially all of the energy of the light provided by an improved illumination system 10 such as that shown in FIG. 1 falls within a radius substantially equal to the radius of the input port of the desired utilization device. In contrast it may also be seen from FIG. 6 (as shown by the solid line) that a large portion of the energy of the light provided by a prior art illumination system 30 such as that shown in FIG. 4 falls at radii greater than the radius of the input port of the desired utilization device. Thus, the energy of the light provided within the input port of the desired utilization device by the prior art illumination system 30 is much lower than the energy of the light provided by the improved illumination system 10.

I claim:
1. An illumination system comprising:
   a source of light disposed along a central axis of the illumination system for radiating light outwardly from the central axis;
   a conical reflector coaxially disposed about the source of light for forming an annular virtual image of the source of light; and
   a lens coaxially disposed about the central axis of the illumination system for providing a circular real image of the annular virtual image of the source of light.

2. An illumination system as in claim 1 wherein the lens is generated by revolving an aspheric lens section about the central axis of the illumination system.

3. An illumination system as in claim 2 wherein the lens is a toroidal lens.

4. An illumination system as in claim 1 wherein the lens is generated by revolving a lens section about the central axis of the illumination system.

5. An illumination system as in claim 4 wherein the lens is a toridal lens.

6. An illumination system as in claim 1 wherein the source of light is of a mercury or xenon type.

7. An illumination system as in claim 1 wherein all portions of the real image have the same magnification with respect to the source of light.

8. An illumination system as in claim 1 wherein the real image is provided at the input port of a light integrator.

9. An illumination system as in claim 4 wherein all portions of the real image have the same magnification with respect to the source of light.

10. An illumination system as in claim 9 wherein the source of light is of a mercury or xenon type.

* * * * *